(12) United States Patent
Vaniglia et al.

(10) Patent No.: US 11,865,801 B2
(45) Date of Patent: Jan. 9, 2024

(54) PROCESS AND PLANT FOR BUILDING TYRES FOR VEHICLE WHEELS

(71) Applicant: Pirelli Tyre S.p.A., Milan (IT)

(72) Inventors: Erika Vaniglia, Milan (IT); Maurizio Marchini, Seregno (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 16/467,309

(22) PCT Filed: Nov. 29, 2017

(86) PCT No.: PCT/IB2017/057486
§ 371 (c)(1),
(2) Date: Jun. 6, 2019

(87) PCT Pub. No.: WO2018/109599
PCT Pub. Date: Jun. 21, 2018

(65) Prior Publication Data
US 2020/0079043 A1   Mar. 12, 2020

(30) Foreign Application Priority Data

Dec. 16, 2016  (IT) ........................ 102016000127302

(51) Int. Cl.
*B29D 30/36* (2006.01)
*B29D 30/24* (2006.01)

(52) U.S. Cl.
CPC ........... *B29D 30/36* (2013.01); *B29D 30/245* (2013.01)

(58) Field of Classification Search
CPC .......... B29D 30/245; B29D 2030/2657; B29D 2030/2664; B29D 2030/265; B29D 2030/203; B29D 30/244; B29D 30/36

(Continued)

(56) References Cited

U.S. PATENT DOCUMENTS 3,560,302 A * 2/1971 Missioux ............... B29D 30/36
156/415
3,616,059 A * 10/1971 Frazier ................. B29D 30/245
156/400

(Continued)

FOREIGN PATENT DOCUMENTS

CN        104884239 A    9/2015
WO   WO 2014/083477 A1   6/2014

(Continued)

OTHER PUBLICATIONS

International Search Report form the European Patent Office in corresponding International Application No. PCT/IB2017/057486 dated Mar. 28, 2018.

(Continued)

*Primary Examiner* — Galen H Hauth
*Assistant Examiner* — Alexander D Booth
(74) *Attorney, Agent, or Firm* — Finnegan, Henderson, Farabow, Garrett & Dunner, L.L.P.

(57) ABSTRACT

In a shaping station (13), a toroidal forming drum (23) is positioned within a carcass sleeve (12) comprising at least one carcass ply (3) associated with a pair of beads (6) in radially inner position. The carcass sleeve (12) is toroidally shaped by radial expansion of the forming drum (23). The forming drum (23) carrying the shaped carcass sleeve (12) is removed from the shaping station (13). Tyre components (7, 8, 9) are applied externally on the shaped carcass sleeve (12), carried by the forming drum (23). At the end of the shaping and during the application of the tyre components (7, 8, 9), axially inner sides of said beads (6) are arranged axially against respective circumferential axially outer portions (S1) of an abutment surface (S) carried by the expanded forming drum (23), having shape corresponding to an inner shape of the shaped carcass sleeve (12).

27 Claims, 11 Drawing Sheets

(58) Field of Classification Search
USPC .......................................... 264/502; 156/415
See application file for complete search history.

(56) References Cited

U.S. PATENT DOCUMENTS

| | | | |
|---|---|---|---|
| 3,654,025 A | | 4/1972 | Winzer et al. |
| 3,684,621 A | | 8/1972 | Frazier et al. |
| 3,833,445 A | | 9/1974 | Mallory et al. |
| 3,923,572 A | * | 12/1975 | Garver .................. B29D 30/36 |
| | | | 156/130 |
| 5,181,982 A | | 1/1993 | Kumagai et al. |
| 2004/0050499 A1 | * | 3/2004 | Barody ................ B29D 30/246 |
| | | | 156/417 |
| 2005/0274449 A1 | | 12/2005 | Tokunaga |
| 2009/0272484 A1 | * | 11/2009 | Seevers .............. B29D 30/2607 |
| | | | 156/118 |
| 2017/0106616 A1 | | 4/2017 | Marchini et al. |

FOREIGN PATENT DOCUMENTS

| | | |
|---|---|---|
| WO | WO 2015/079344 A1 | 6/2015 |
| WO | WO 2015/097636 A1 | 7/2015 |
| WO | WO 2015/181654 A1 | 12/2015 |
| WO | WO 2016/157001 A1 | 10/2016 |

OTHER PUBLICATIONS

Written Opinion of the International Searching Authority from the European Patent Office in corresponding International Application No. PCT/IB2017/057486 dated Mar. 28, 2018.

Notification of the First Office Action dated Feb. 10, 2021, from China National Intellectual Property Administration, in counterpart Chinese Application No. 201780075604.4.

* cited by examiner

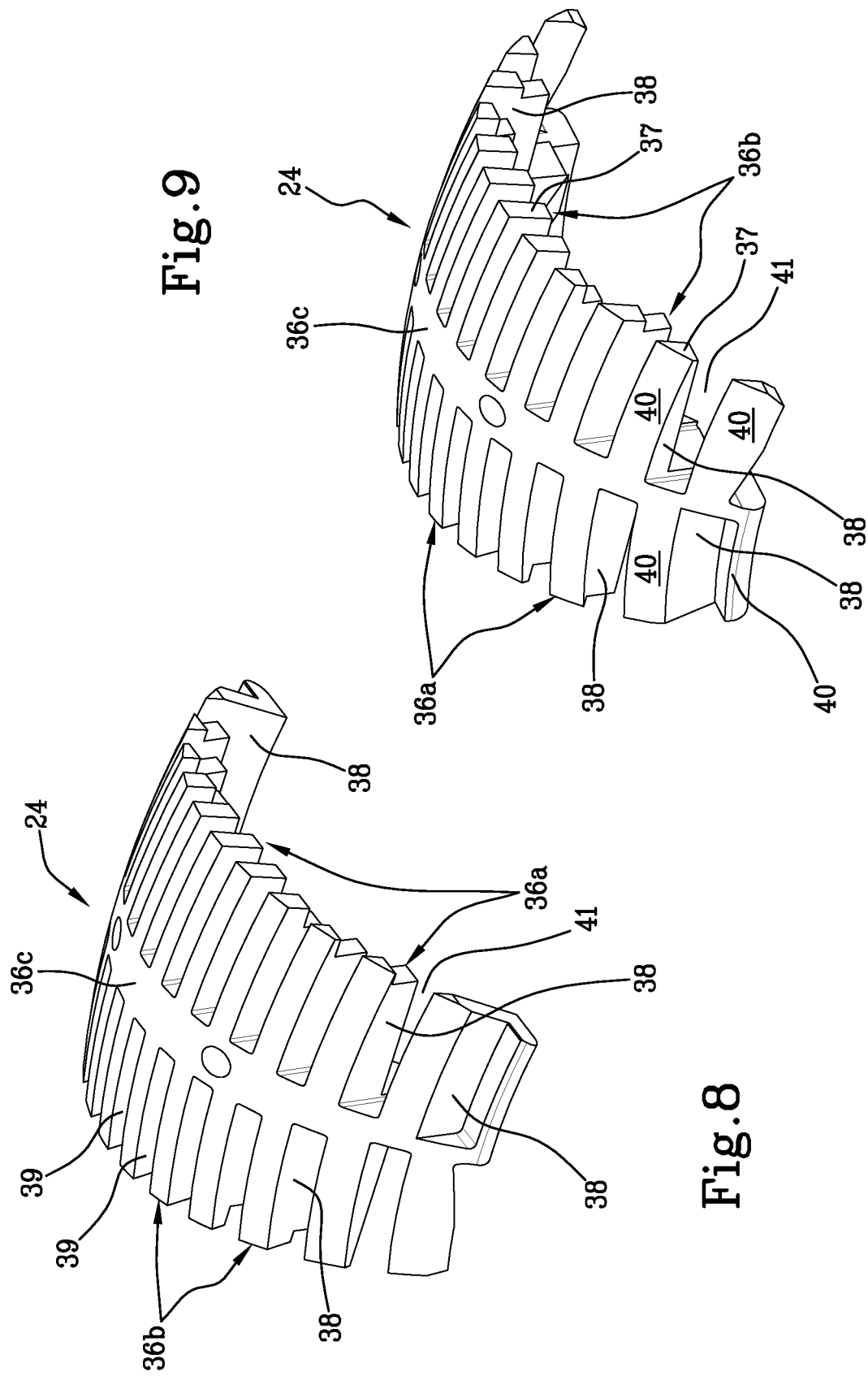

PROCESS AND PLANT FOR BUILDING TYRES FOR VEHICLE WHEELS

This application is a national stage entry application under 35 U.S.C. § 371 based on International Application No. PCT/IB2017/057486, filed Nov. 29, 2017, and claims priority to Italian Patent Application No. 102016000127302, filed Dec. 16, 2016; the contents of each application is incorporated herein by reference.

The present invention regards a process and a plant for building tyres for vehicle wheels.

More particularly, the invention is directed towards building green tyres, to be subsequently subjected to a cycle of moulding and vulcanisation for the obtainment of the final product.

With the term "elastomeric material" it is intended to indicate a composition comprising at least one elastomeric polymer and at least one reinforcement filler. Preferably, such composition also comprises additives such as, for example, a cross-linking agent and/or a plasticising agent. Due to the presence of the cross-linking agent, by means of heating such material can be cross-linked, so as to form the final manufactured item.

By "tyre for two-wheel vehicles", in particular motorcycles, it is intended a tyre whose curvature ratio is approximately comprised between about 0.15 and about 0.45.

By "curvature ratio" relative to a tyre (or to a portion thereof) it is intended the ratio between the distance of the radially outer point of the tread band (or of the outer surface) from the line passing through the laterally opposite ends of the tread itself (or of the outer surface itself), measured on a radial plane of the tyre (or of said portion thereof), and the "chord" of the tyre (or of a portion thereof), i.e. the distance measured between said ends.

By "curvature ratio" relative to a forming drum, it is intended the ratio between the distance of the radially outer point of the outer surface of the drum from the line passing through the laterally opposite ends of the drum itself, measured on a radial plane of the drum, and the distance measured along the chord of the drum between said ends.

The terms "radial" and "axial" and the expressions "radially inner/outer" and "axially inner/outer" are used by making reference to the radial direction of the forming drum used/of the tyre (i.e. to a direction perpendicular to the rotation axis of the aforesaid forming drum/tyre) and to the axial direction of the forming support used/of the tyre (i.e. to a direction parallel to the rotation axis of the aforesaid forming drum/tyre).

The terms "circumferential" and "circumferentially" are instead used by making reference to the annular extension of the aforesaid forming support/tyre.

A plane is defined "radial" with respect to a forming drum or to a tyre when it contains the rotation axis of the forming drum or of the tyre, respectively.

By "elementary semi-finished product" it is intended an elongated continuous element made of elastomeric material. Preferably such elongated continuous element can comprise one or more textile and/or metallic cords. Preferably such elongated continuous element can be cut to size.

By "component" or "structural component" of a tyre, it is intended any one portion thereof capable of performing its own function or a part thereof. For example, components of the tyre include the liner, the under-liner, the sidewall inserts, the bead cores, the filler inserts, the anti-abrasive, the sidewalls, the carcass ply/plies, the belt layer(s), the tread band, the underlayer of the tread band, the under-belt inserts etc., or a part thereof.

A tyre for vehicle wheels generally comprises a carcass structure comprising at least one carcass ply having respectively opposite ends engaged with respective anchoring annular structures, integrated in the zones normally identified with the name "beads", having an inner diameter substantially corresponding to a so-called "fitting diameter" of the tyre on a respective mounting rim.

The carcass structure is associated with a belt structure that can comprise one or more belt layers, situated in radial superimposition one with respect to the other and with respect to the carcass ply, having textile or metallic reinforcement cords with cross orientation and/or substantially parallel to the circumferential extension direction of the tyre (at 0 degrees). In radially outer position with respect to the belt structure, a tread band is applied, it too made of elastomeric material like other semi-finished products constituting the tyre.

Respective sidewalls made of elastomeric material are also applied in axially outer position on the lateral surfaces of the carcass structure, each extended from one of the side edges of the tread band up to the respective anchoring annular structure to the beads. In the tyres of "tubeless" type, a coating layer that is impervious to air, normally termed "liner", covers the inner surfaces of the tyre.

Following the building of the green tyre actuated by assembling respective components, a moulding and vulcanisation treatment is generally executed aimed to determine the structural stabilisation of the tyre by means of cross-linking of the elastomeric compositions as well as to impart on the same, if required, a desired tread pattern and possible distinctive graphic marks at the sidewalls of the tyre.

The carcass structure, generally in sleeve form, and the belt structure are generally made separately from each other in respective work stations, in order to be mutually assembled at a later time.

The same Applicant in WO 2015/079344 illustrates a building process in which the carcass sleeve and the belt structure of each tyre are made sequentially with respect to each other. More particularly, a carcass sleeve, transferred into a shaping station, is situated in radially outer position with respect to a toroidal forming drum arranged in a first radially contracted operating condition. The carcass sleeve, retained by annular gripping elements operating at the beads, is shaped according to a toroidal configuration while the forming drum is positioned inside the carcass sleeve. During the shaping of the carcass sleeve, the forming drum is radially expanded up to a second radially expanded operating condition. When the forming drum reaches the second operating condition of maximum radial expansion, the annular gripping elements complete a slight mutual axial approach movement, being partially inserted in the radially inner edges of the forming drum itself, in order to allow completing the shaping of the carcass sleeve. The final coupling with the forming drum takes place following the evacuation of the operating fluid previously introduced during shaping, such that the carcass sleeve undergoes a slight elastic contraction, when abutting against an abutment surface presented outside the forming drum itself.

WO 2015/097636, on behalf of the same Applicant, describes a forming drum that is particularly suitable for a building process of the above-described type. Such drum is formed by circumferentially consecutive sectors that are radially movable between a contracted condition and an expanded condition. In the expanded condition, the forming drum is adapted to support the carcass sleeve against an outer abutment surface having circumferential rows of solid portions interposed between empty portions. The forming drum carrying the carcass sleeve is then adapted to be picked up by the shaping station and transferred to devices which provide for the application of further components such as belt layers, tread band and/or sidewalls on the carcass sleeve itself, in order to complete the building of the tyre before subjecting it to the vulcanisation treatment.

The Applicant has observed that the systems known for example from WO 2015/079344 and/or WO 2015/097636 offer considerable operating flexibility in making components such as the tread band and sidewalls, which can be directly made on the carcass structure supported by the forming drum, after the application of the belt structure.

For example, the Applicant has observed that by depositing an elementary semi-finished product fed by a dispenser on a toroidal forming drum, while the latter is suitably moved at the dispenser itself, it is possible to very precisely distribute the elementary semi-finished product by means of side by side and/or at least partially superimposed turns, so as to form a desired structural component of the tyre (e.g. a tread band or a sidewall) with greater precision than that normally attainable when conventional semi-finished piece products are employed cut to size.

The Applicant has nevertheless observed that during the application of components of the tyre on the carcass structure—in particular by the execution of a coiling, for example employing a toroidal drum of the type described in the document WO 2015/097636—when the drum is supported and suitably moved in order to manage the distribution of the elementary semi-finished products, the thrust action exerted for example by an applicator roller tends to push the elementary semi-finished product, together with the underlying parts of the carcass structure, into the empty portions of the abutment surface, towards the interior of the corresponding cavities.

In particular, the Applicant has also observed that while, in the axially inner zones of the abutment surface, the structural consistency of the carcass structure is able to put forward sufficient resistance to the penetration in the aforesaid cavities, this might not occur with the same effectiveness in proximity to the axially outer zones, which abut against the axially opposite edges of the abutment surface.

Indeed, the abutment surface has, in a given radial plane, an orientation that is continuously variable from the zones proximal to the axial middle line plane of the drum, where the abutment surface is substantially parallel to the rotation axis thereof, up to in proximity of the axially opposite edges of the abutment surface, where the orientation of the latter is significantly tilted towards a substantially radial direction. Consequently, the cavities closest to the axially opposite edges of the forming drum generate, on the abutment surface, empty portions of greater size than those generated by cavities of equal axial dimension, close to the axial middle line plane.

The Applicant has also observed that the abovementioned problem becomes more significant since, in the processes and with the apparatuses of the type of those described in WO 2015/079344 and WO2015/097636, the beads lose stability when they are disengaged from the annular gripping elements that retain them up to the end of the shaping step. Indeed, following the disengagement and moving away of the annular gripping elements from the beads, the latter remain projectingly suspended with respect to radially inner and axially outer edges of the forming drum.

This phenomenon consequently determines that precisely in the radially inner and axially outer portions of the forming drum where the incidence of the "empty" portions of the forming drum itself is higher, the abutment of the beads is not stable and consequently it becomes more complex to deposit elementary semi-finished products, in particular by means of coiling, aimed for building further components of the tyre.

The Applicant has thus perceived that—not being able to operate in a significant manner for physical reasons on the geometry of a expandable/contactable toroidal forming drum, which will in any case have radially inner and axially outer empty portions in expanded condition in order to allow the operation thereof—it becomes opportune to confer to the beads a more stable positioning with respect to the forming drum itself when coupled to the carcass structure (i.e. to the shaped carcass sleeve). In such a manner, the stresses transmitted by the members set for applying the further components will be effectively opposed and therefore a correct application of the latter would be facilitated, even above the radially more internal zones and axially more external zones of the carcass structure.

The Applicant has thus found that by entrusting the toroidal expandable/contractible forming drum with the task of providing a stable support for the beads—such drum itself carrying out the shaping of the carcass sleeve—during the application of the further components of the tyre it becomes possible to facilitate a precise deposition of the latter, e.g. by coiling, also in proximity to the beads and/or to the radially inner and axially outer zones of the carcass structure associated with the aforesaid forming drum.

More particularly, the present invention regards, in a first aspect, a process for building tyres.

Preferably, in a shaping station, a toroidal forming drum is positioned within a carcass sleeve comprising at least one carcass ply associated with a pair of beads.

Preferably, the carcass sleeve is toroidally shaped by radial expansion of the forming drum.

Preferably, the forming drum carrying the shaped carcass sleeve is removed from the shaping station. Preferably, tyre components are applied externally on the shaped carcass sleeve, carried by the forming drum.

Preferably, at the end of the shaping of the carcass sleeve and during the application of said tyre components, axially inner sides of said beads are entirely arranged in axial abutment relation against respective circumferential axially outer portions of an abutment surface carried by the expanded forming drum.

Preferably, said expanded forming drum has a toroidal shape corresponding to an inner shape of the shaped carcass sleeve.

The Applicant in fact deems that the structural consistency of the bead cores, assisted by the axial abutment of the same against the drum, can induce a suitable stiffening of the carcass structure in the zones proximal to the beads, so as to effectively opposite the thrust actions exerted by rollers or other applicator members during coiling. A correct application of the elongated continuous elements in side by side turns, even at the beads, is therefore facilitated without possible surface discontinuities—given by the alternation of solids/empty spaces on the abutment surface of the forming drum—leading to excessive difficulties.

In accordance with a further aspect, a plant for building tyres forms the object of the invention.

Preferably, provision is made for a shaping station comprising engagement devices for engaging a carcass sleeve comprising at least one carcass ply associated with a pair of beads.

Preferably, provision is made for a toroidal forming drum which can be engaged in the shaping station within the carcass sleeve and comprising radially movable circumferentially consecutive sectors.

Preferably, provision is made for actuator devices operating in the shaping station for radially expanding the forming drum by radially moving away the sectors within the carcass sleeve, between a first radially contracted operating condition and a second radially expanded operating condition, in which said forming drum carries an abutment surface having a toroidal shape corresponding to an inner shape of the shaped carcass sleeve.

Preferably, provision is made for deposition devices for applying tyre components on the shaped carcass sleeve.

Preferably, provision is made for transfer devices configured for transferring the forming drum carrying said carcass sleeve toroidally shaped from the shaping station to said deposition devices.

Preferably, in the second operating condition the abutment surface of said forming drum has radially inner circumferential edges having diameter smaller than a radially inner diameter of said beads.

In at least one of the aforesaid aspects, the invention can also comprise one or more of the following preferred characteristics.

Preferably, the shaping takes place due to the effect of a radial thrust action exerted by the forming drum directly against the carcass sleeve.

Preferably, the shaping takes place in the absence of internal pressurisation of the carcass sleeve.

Preferably, during shaping, radially inner parts of the carcass sleeve are in fluid communication with an external environment.

The shaping therefore only takes place due to the effect of mechanical actions. It is therefore possible to reduce the structural complexity and the financial investments generally induced by the need to obtain a shape by action of a pressurised fluid according to the prior art.

Preferably, at the end of shaping, the forming drum imposes a controlled tension on the carcass sleeve, so that the beads act in axial thrust relation against the circumferential axially outer portions of the abutment surface.

Preferably, in the shaping station, the carcass sleeve is engaged by gripping elements operating axially and/or radially inside the beads.

The engagement action at the beads facilitates a precise positioning of the carcass sleeve in the shaping station, for the purpose of an optimal coupling with the forming drum.

Preferably, provision is also made for the action of radially expanding said gripping elements, each axially inside one of said beads, for engaging the carcass sleeve prior to the shaping.

Preferably, the gripping elements disengage the beads during the expansion of the forming drum, after a radially outer portion of the forming drum has abutted against the carcass sleeve.

Preferably, the gripping elements disengage the beads during the expansion of the forming drum after a radially outer portion of the forming drum has come into direct contact with the carcass sleeve.

Preferably, the gripping elements disengage the beads during the expansion of the forming drum, before the shaping of the carcass sleeve is completed.

Preferably, the gripping elements are disengaged from the beads during shaping, after said abutment surface has abutted against the carcass sleeve.

Preferably, the gripping elements are disengaged from the beads during shaping, after said abutment surface has come into contact with the carcass sleeve.

The disengagement of the gripping elements from the carcass sleeve allows carrying out the application of the further tyre components in locations that are different from those on which the shaping takes place. In addition, the Applicant deems that the removal of the gripping elements from the beads before the completion of the shaping allows preventing problems of mechanical interference between the same gripping elements and the forming drum at the end of shaping. The use of a forming drum having geometric characteristics suitable for providing a suitable abutment against the beads is therefore simplified. The possibility of operating the shaping in shorter time periods is also attained, enhancing productivity, without having to operate a careful control of the synchronisation between the movements completed by the gripping elements with respect to those of the forming drum in expansion phase.

Preferably, the forming drum is arranged in a first radially contracted operating condition, before being placed within the carcass sleeve.

Preferably, during the shaping of the carcass sleeve, circumferentially consecutive sectors of said forming drum radially translate between a first radially contracted operating condition in which said sectors are approached with respect to a geometric rotation axis of the forming drum, and a second radially expanded operating condition, in which the sectors are radially distanced from said geometric rotation axis to define said abutment surface.

Preferably, the shaping takes place by radially moving away the sectors of the forming drum up to said second operating condition.

Preferably, said circumferential axially outer portions are defined on circumferentially consecutive sectors of the forming drum.

Preferably, each of said sectors has, in radially outer position, a cross section profile extending according to said abutment surface from one to the other of said circumferential axially outer portions.

Preferably, provision is made for the action of axially moving away the beads one with respect to the other, before said abutment surface abuts against the carcass sleeve.

Preferably, provision is made for the action of axially moving away the beads one with respect to the other, before said abutment surface comes into contact with the carcass sleeve.

Preferably, the abutment surface is at least partially defined by a stratiform coating applied on the forming drum.

Preferably, said stratiform coating comprises an elastic membrane.

According to the Applicant, the interposition of an elastic membrane between the carcass sleeve and the sectors or other rigid parts of the forming drum facilitates an optimal control of the shaping of the carcass sleeve. The elastic membrane in fact prevents a direct contact of the carcass sleeve with the sectors, whose movement in expansion phase could cause undesired distortions and irregular stresses on the carcass sleeve itself.

Preferably, during the expansion of the forming drum, said stratiform coating expands in sliding contact relation against the sectors.

The relative sliding between movable rigid parts and deformable parts during shaping is therefore localised in the interface between sectors and elastic membrane.

Preferably, during the expansion of the forming drum, said stratiform coating expands in substantially static contact relation against the radially inner surface of the carcass sleeve.

Preferably, during the expansion of the forming drum, said stratiform coating expands in substantial absence of sliding with respect to the radially inner surface of the carcass sleeve.

The elastic membrane is therefore adapted to be expanded and shaped together with the carcass sleeve, in substantial absence of relative sliding with the inner surfaces of the latter, preserving the integrity thereof during shaping.

Preferably, during the radial expansion of the forming drum, the abutment surface abuts against the carcass sleeve progressively towards the beads.

Preferably, during the radial expansion of the forming drum, the abutment surface comes into contact with the carcass sleeve progressively towards the beads.

Preferably, during the radial expansion of the forming drum, a progressive axial approach of the beads towards the abutment surface is carried out as a result of tensions transmitted through the carcass sleeve.

Preferably, the carcass sleeve is axially centred with respect to the forming drum prior to the shaping.

Preferably, the carcass sleeve is axially centred with respect to the forming drum prior to the shaping, by the axial movement of the gripping elements.

Preferably, the carcass sleeve is made in at least one building location and subsequently transferred to said shaping station.

Preferably, the carcass sleeve is arranged around the forming drum arranged in the shaping station, by a relative axial translation between the carcass sleeve and the forming drum.

Preferably, the forming drum removed from the shaping station is transferred to deposition devices to build, externally on the carcass sleeve, at least one of said tyre components.

Preferably, at least one of said tyre components is made by wrapping at least one elongated continuous element according to circumferential turns axially side by side around a radially outer surface of the carcass sleeve coupled to the forming drum.

Preferably, at least one of said tyre components comprises at least one sidewall portion having a radially inner apex joining with one of said beads.

Preferably, each of said sectors has, in radially outer position, a cross section profile extending according to said abutment surface from one to the other of said radially inner circumferential edges.

Preferably, the forming drum in the first radially contracted operating condition has a maximum outer diameter smaller than a radially inner diameter of the beads.

Preferably, said forming drum has a stratiform coating engaged in sliding contact relation on said sectors at the abutment surface.

Preferably, said forming drum comprises an elastic membrane arranged outside said sectors and at least partially defining said abutment surface.

Preferably, the elastic membrane has radially inner circumferential flaps constrained to the sectors at said radially inner circumferential edges.

Preferably, the elastic membrane has a radially inner surface engaged in sliding contact relation on said sectors.

Preferably, each sector has circumferentially opposite coupling portions, each comprising elongated protrusions alternated with circumferentially elongated cavities, in which the protrusions of each sector are slidably engaged in the respective cavities of circumferentially adjacent sectors.

Preferably, in the second operating condition, the forming drum has circumferential rows of solid portions interposed between empty portions.

Preferably, said solid portions and empty portions are respectively defined on said protrusions and by said cavities.

Preferably, provision is also made for a carcass building line, in which said engagement devices comprise carcass loading devices configured for transferring the carcass sleeve from the carcass building line to the shaping station.

Preferably, said carcass loading devices comprise a carcass handler operating on a radially outer surface of the carcass sleeve.

Preferably, said engagement devices comprise a pair of gripping elements coaxially facing each other and operatively engageable with said beads.

Preferably, said engagement devices comprise axial movement members for the gripping elements.

Preferably, said gripping elements have circumferential engagement seats radially expandable for operating in thrust relation against the beads.

Preferably, said axial movement members comprise at least one carriage carrying one of said gripping elements and movable towards the other gripping element to switch the shaping station between a condition of loading/unloading, in which the gripping elements are mutually distanced according to an extent greater than an axial dimension of the non-shaped carcass sleeve, and a working condition, in which the gripping elements are mutually distanced according to an extent substantially corresponding to the axial dimension of the carcass sleeve.

Preferably, in the second operating condition, the abutment surface carried by said forming drum has radially inner circumferential edges having diameter smaller than a radially outer diameter of said gripping elements.

Preferably, said deposition devices are installed in at least one application station that is remote with respect to said shaping station.

Further characteristics and advantages will be clearer from the detailed description of a preferred but not exclusive embodiment of a process and a plant for making tyres, in accordance with the present invention.

BRIEF DESCRIPTION OF THE DRAWINGS

Such description will be set forth hereinbelow with reference to the enclosed drawings, provided only as a non-limiting example, in which:

FIGS. 8 and 9 show a single sector of the forming drum seen in perspective view from respectively opposite angles;

With reference to the abovementioned figures, reference number 1 overall indicates a plant for building tyres for vehicle wheels, arranged to actuate a process according to the present invention.

Figure 12:
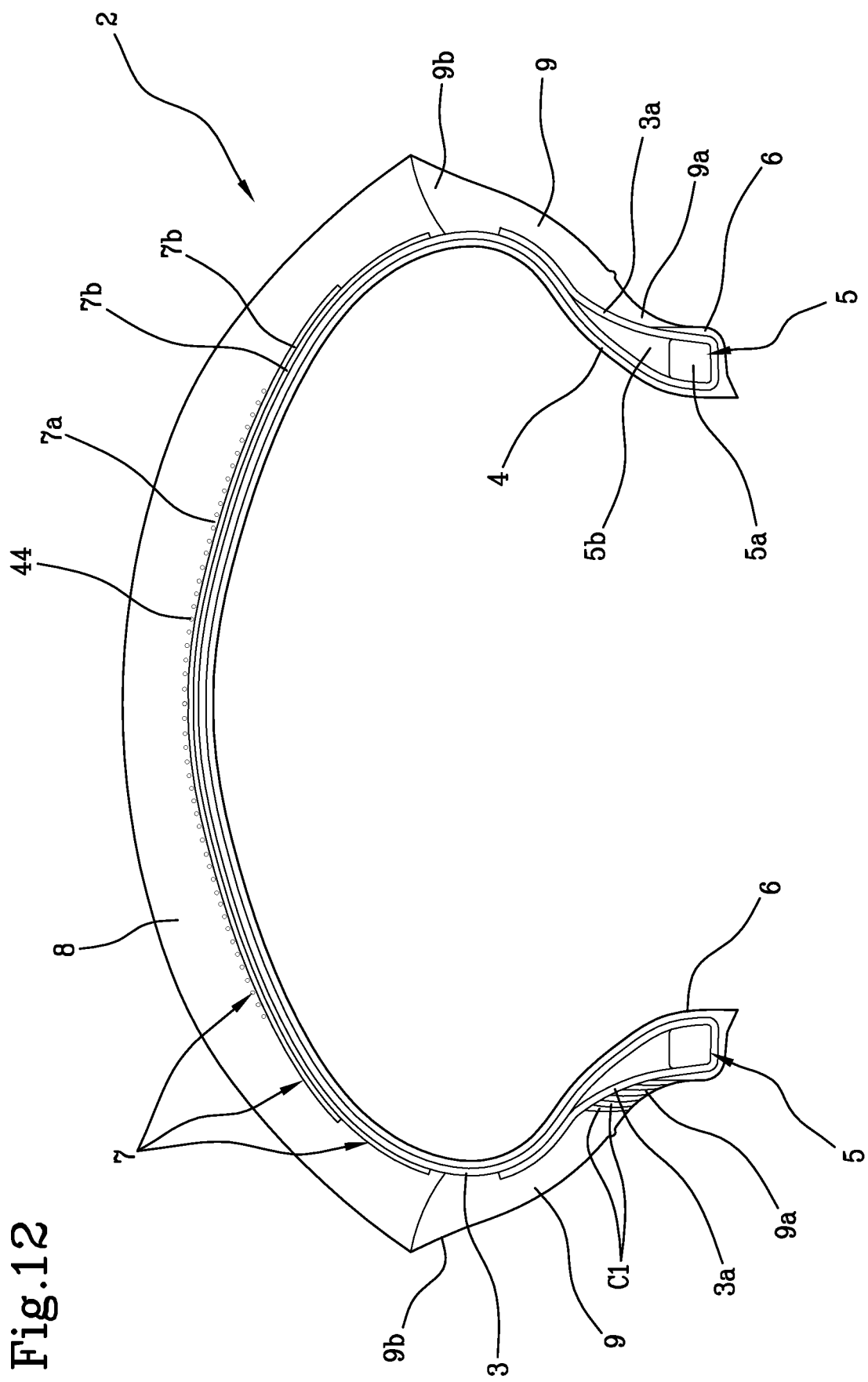
FIG. 12 schematically shows a radial half-section of a tyre attainable in accordance with the present invention.

The plant 1 is set to make tyres 2 (FIG. 12) essentially comprising at least one carcass ply 3 preferably internally covered by a layer of impermeable elastomeric material or so-called liner 4. Two anchoring annular structures 5, each comprising a so-called bead core 5a, are engaged with respective end flaps 3a of the carcass ply/plies 3. Each bead core 5a preferably carries an elastomeric filler 5b in radially outer position. The anchoring annular structures 5 are integrated in proximity to zones normally identified with the name "beads" 6, at which the engagement between the tyre 2 and a respective mounting rim (not depicted) normally takes place.

A belt structure 7 is circumferentially applied around the carcass ply/plies 3, and a tread band 8 is circumferentially superimposed on the belt structure 7. Two sidewalls 9, each extending from the corresponding bead 6 to a corresponding lateral edge of the tread band 8, are applied in laterally opposite positions on the carcass ply/plies 3. Each sidewall 9 can have a radially inner apex 9a joining with one of said beads 6, and a radially outer apex 9b joining with an axially outer edge of the tread band 8.

The plant 1 comprises a carcass building line 10 having one or more building locations 11 where the making of a carcass sleeve having substantially cylindrical shape is executed, for example according to known modes. The carcass sleeve 12 comprises said at least one carcass ply 3, preferably internally covered by the liner 4, and having the respective end flaps 3a engaged, e.g. by means of turning up, with the respective anchoring annular structures 5. If necessary, the carcass sleeve 12 made on the carcass building line 10 can also comprise the sidewalls 9 or portions thereof, each extending starting from a respective bead 6.

The carcass building line 10 refers to a shaping station 13 comprising engagement devices 14 for the carcass sleeve 12 and shaping devices 15, upon action whereof the carcass sleeve 12 is shaped according to a toroidal configuration.

The engagement devices 14 comprise for example a first gripping element 16a and a second gripping element 16b preferably annular, coaxially facing each other and having respective circumferential engagement seats 17a, 17b, radially expandable, by means of which they are operatively engageable, each at one of the beads 6 respectively carried by the axially opposite ends of the carcass sleeve 12.

The engagement devices 14 can also comprise axial movement members 18 for the gripping elements 16a, 16b. More in detail, provision can be made such that at least one of the gripping elements 16a, 16b, for example the first gripping element 16a, is carried by a movable carriage 19 along one or more linear guides 20, parallel to a geometric axis of mutual alignment between the gripping elements 16a, 16b and preferably integral with respect to a fixed base 21, carrying the second gripping element 16b. The movement of the carriage 19 along the linear guides 20 determines the communication of the shaping station 13 between a condition of loading/unloading and a working condition. In the loading/unloading condition (FIG. 2), the first gripping element 16a is spaced from the second gripping element 16b according to an extent that is greater—explanatorily at least double—than an axial dimension of the non-shaped carcass sleeve 12, coming from the carcass building line 10. In the working condition, the gripping elements 16a, 16b, and more precisely the respective circumferential engagement seats 17a, 17b thereof, are mutually spaced according to an extent substantially corresponding to the axial dimension of the carcass sleeve 12.

The shaping devices 15 can for example comprise a toroidal forming drum 23, rigid and expandable, which is arranged within the carcass sleeve 12 in the shaping station 13.

Figure 6:
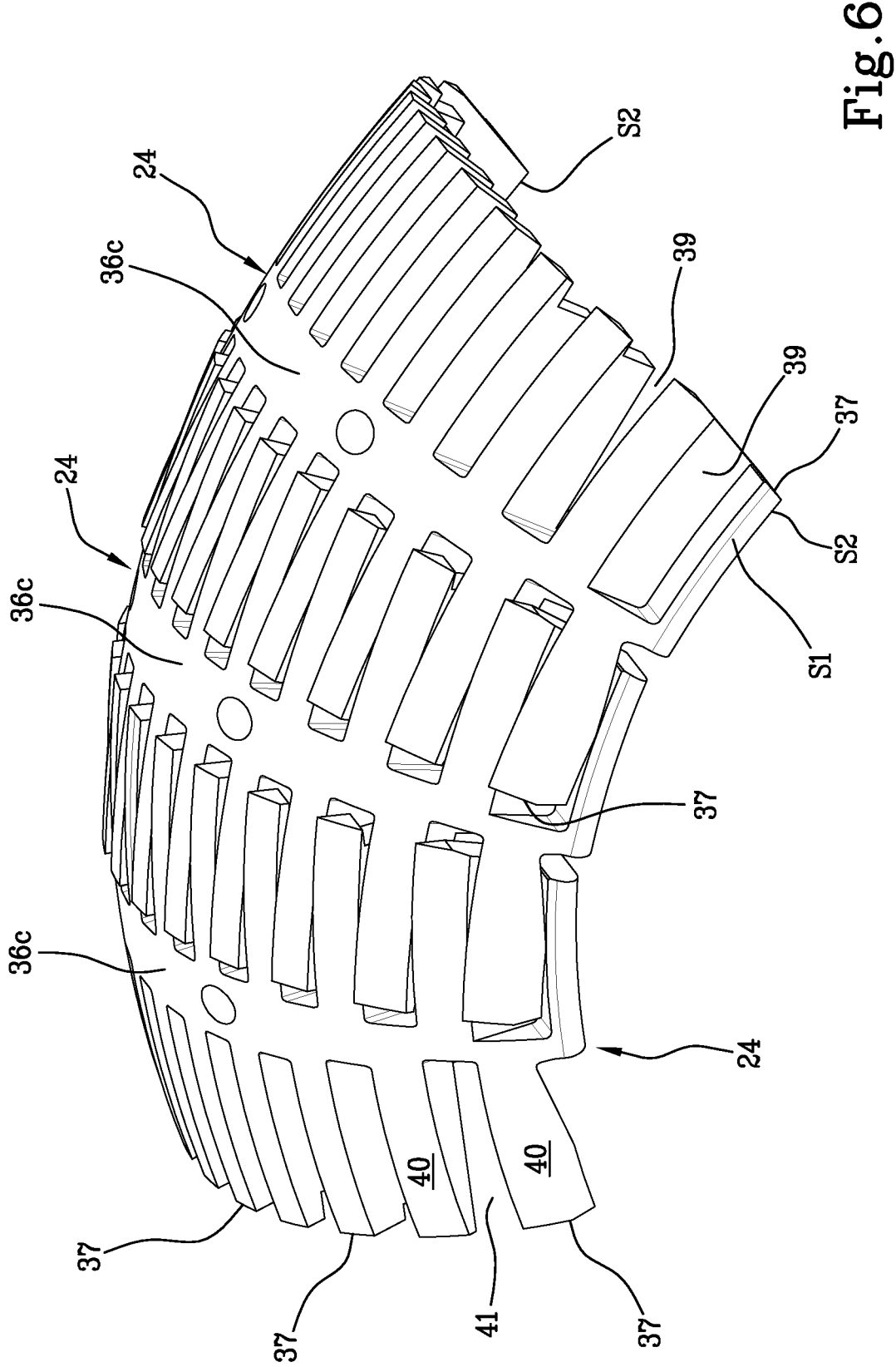
FIG. 6 shows a perspective view of several sectors of a forming drum in a first operating condition, radially contracted.
Figure 7:
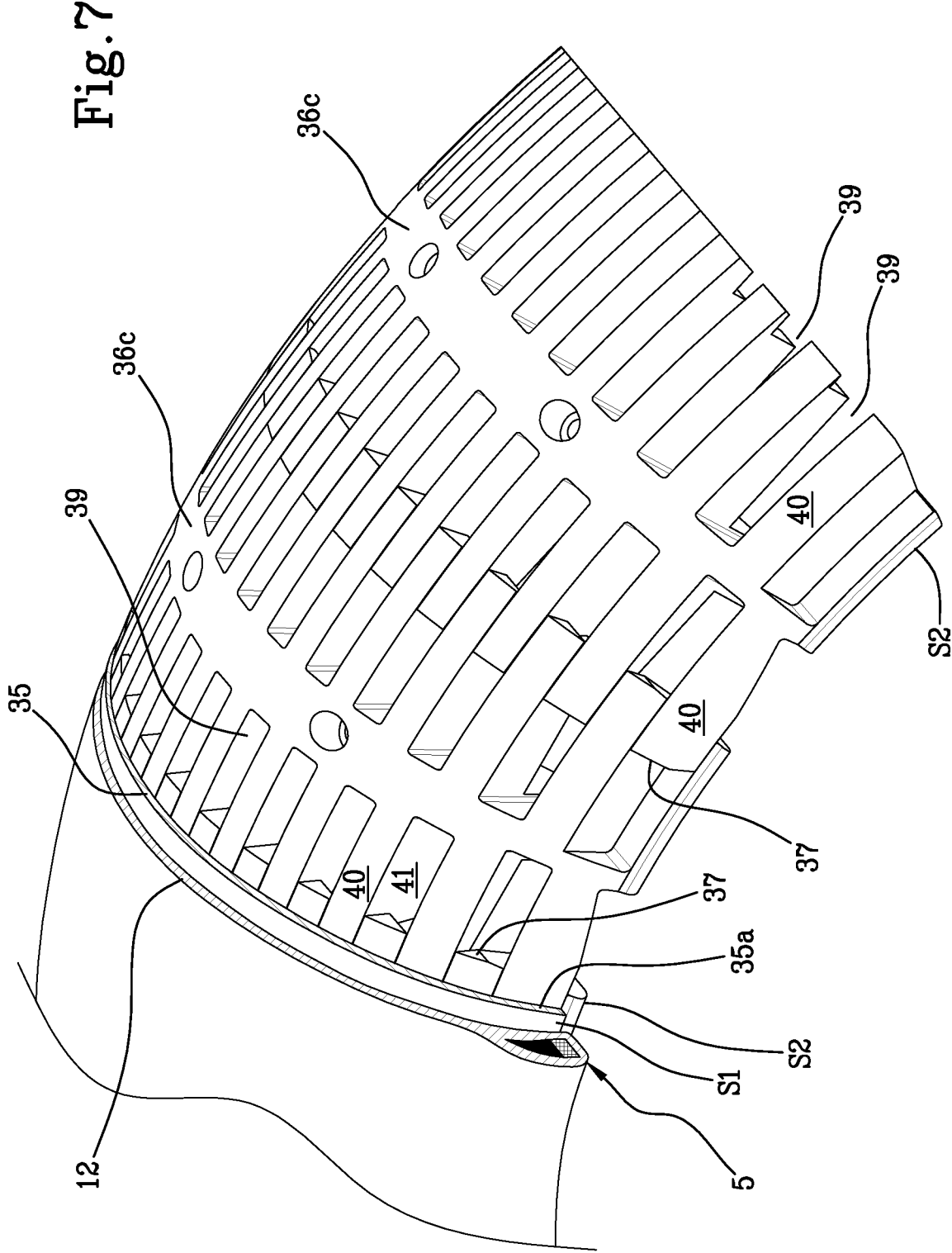
FIG. 7 shows the sectors of FIG. 6 in a second operating condition, radially expanded.
Figure 10:
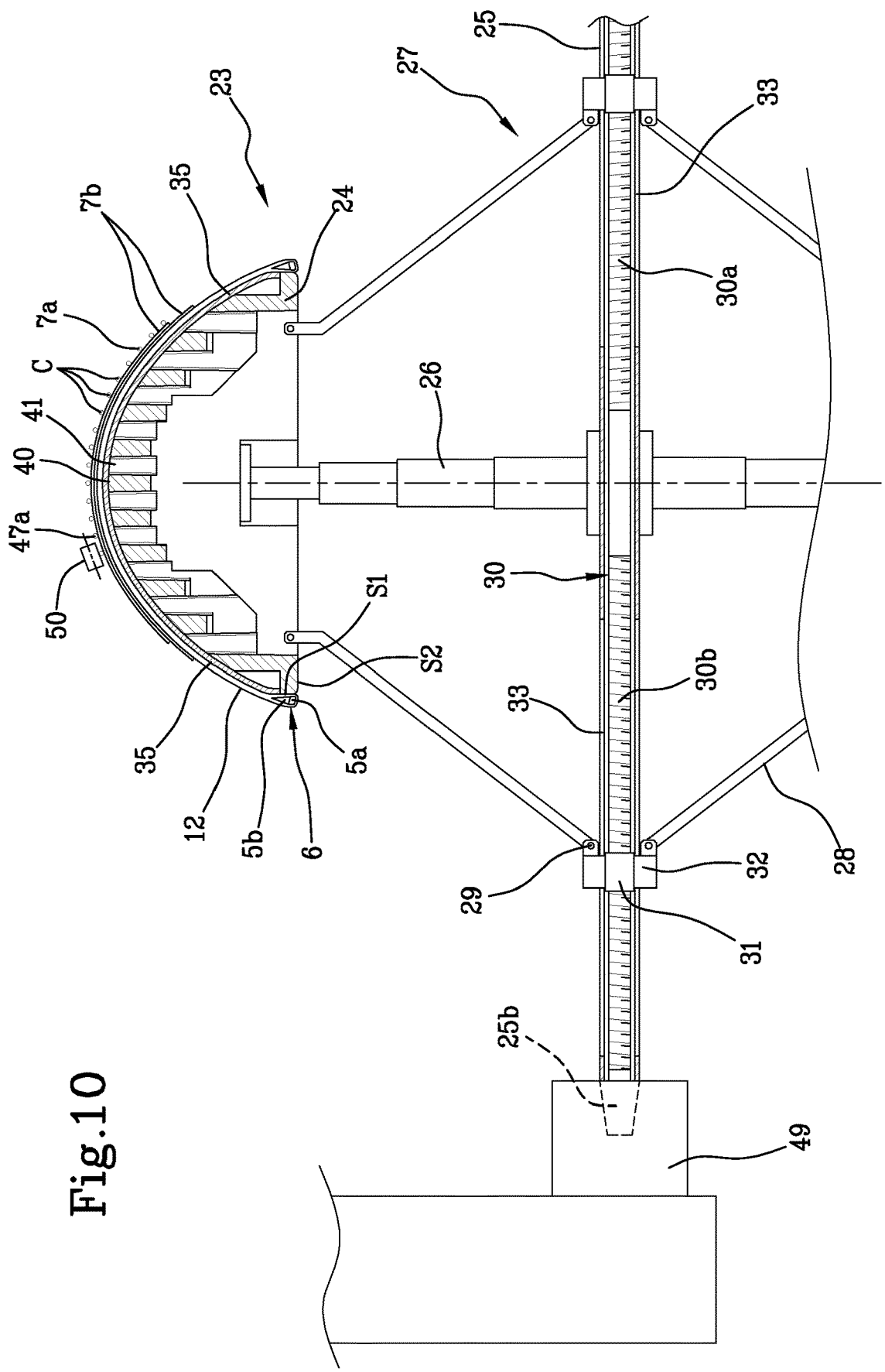
FIG. 10 shows the application of a belt layer on the shaped carcass sleeve that is coupled to a forming drum.

The forming drum 23 is expandable between a first operating condition, radially contracted (FIGS. 2, 3 and 6), and a second radially expanded operating condition (FIGS. 5, 7, 10 and 11). For such purpose, provision can for example be made such that the forming drum 23 comprises a plurality of sectors 24 circumferentially distributed around a central shaft 25.

The sectors 24 are movable, preferably simultaneously with respect to each other, from the aforesaid first operating condition in which they are approached to the central shaft 25, to the second operating condition in which said sectors 24 are moved away from the central shaft 25. For such purpose, provision can be made such that the sectors 24 are carried by respective telescopically extensible guide members 26, radially extending from the central shaft 25.

The movement of the sectors 24 can be attained by transmission mechanisms 27, for example comprising driving levers 28 hinged, each at the respectively opposite ends thereof, to one of said sectors 24 and to at least one driving collar 29 slidably fit along the central shaft 25. More particularly a pair of driving collars 29 situated along the central shaft 25 are preferably provided in axially opposite position with respect to the sectors 24, each engaging respective driving levers 28.

Each driving collar 29 is operatively connected to a threaded bar 30, rotatably engaged coaxially within the central shaft 25. The threaded bar 30 extends along the central shaft 25, nearly for the entirely length thereof or beyond, and carries two axially opposite threads 30a, 30b, respectively clockwise and anticlockwise. On the threads 30a, 30b, respective nut screws 31 are operatively engaged, axially movable inside the central shaft 25, each connected to one of the driving collars 29, e.g. by means of at least one block 32 radially traversing the central shaft 25 at a longitudinal slit thereof 33.

The rotation of the threaded bar 30 in the central shaft 25, actuatable by means of a rotary driver 34 or actuator devices of another type operating in the shaping station 13, determines an axial movement of the nut screws 31 and of the driving collars 29, corresponding with a radial movement of the sectors 24, towards the first or the second operating condition depending on the rotation direction of the threaded bar 30.

Preferably the forming drum also comprises at least one elastic membrane 35 or other stratiform coating, e.g. made of viscous material, engaged in sliding contact relation on the sectors 24. In the illustrated example, the membrane 35 is fit in a condition of suitable elastic dilation outside the sectors 24 when the forming drum is in the first operating condition. The membrane 35, preferably made of elastomeric material with low friction coefficient, such as EPDM or silicone, has a radially inner surface engaged in sliding contact relation on the sectors 24, and is further expanded during the expansion of the forming drum 23 towards the second operating condition.

The expanded forming drum 23 in the second operating condition has a toroidal shape corresponding to an inner shape of the shaped carcass sleeve 12. More particularly, the set of the sectors 24 and/or the possible elastic membrane 35 or other stratiform coating applied around the same define along the circumferential extension of the forming drum, in radially outer position, a toroidal abutment surface S shaped according to the internal configuration that the carcass sleeve 12 must assume upon completed shaping. The abutment surface S is delimited between respective circumferential axially outer portions S1, arranged at radially inner circumferential edges S2 of the same abutment surface S.

Advantageously, provision can be made such that the forming drum 23 in the second operating condition has a curvature ratio comprised between about 0.15 and about 0.45, typically suitable for making tyres for motorcycles or other two-wheel vehicles. If necessary, curvature ratios with values smaller than those indicated above can nevertheless be employed, e.g. suitable for the production of tyres for cars or trucks.

As illustrated in FIGS. 8 and 9, each of the sectors 24 has a first coupling portion 36a and a second coupling portion 36b which are circumferentially opposite, preferably interconnected by means of an intermediate portion 36c which has, at least on the abutment surface S, a main extension direction parallel to a radial plane of the forming drum 23. Each of the coupling portions 36a, 36b has a plurality of elongated protrusions 37 extended in circumferential direction from the intermediate portion 36c, alternated with respective circumferentially elongated cavities 39.

In a same sector 24, the protrusions 37 belonging to one of the coupling portions, for example the first coupling portion 36a, are offset with respect to the protrusions 37 of the other coupling portion 36b.

At least some of the protrusions 37 can have substantially plate-like structure, and lie according to surfaces parallel to a circumferential extension direction of the abutment surface S. Such protrusions 37 therefore have side walls 38 extending according to planes orthogonal to the geometric rotation axis X-X of the drum.

At least some of the cavities 39 are axially delimited, each between the side walls 38 of two axially consecutive protrusions 37. As better illustrated in FIGS. 6 and 7, the protrusions 37 of each sector 24 are slidably engaged in the respective cavities 39 of the circumferentially adjacent sectors 24, and are adapted to slide in the cavities themselves in order to support the expansion and contraction movements of the forming drum 23.

The side walls 38 of the protrusions 37, respectively mating, belonging to circumferentially contiguous sectors 24, mutually guide the sectors themselves during the expansion and contraction movement, and facilitate the maintenance of a satisfactory structural solidity of the forming drum 23 in its entirety, both in the first operating condition and in the second operating condition.

In the first operating condition (FIG. 6), the protrusions 37 of each sector 24 penetrate into the respective cavities 39, approaching until touching (or nearly touching) the intermediate portion 36c of the adjacent sector 24. For example, in the first operating condition, the protrusions 37 can be inserted in the respective cavities 39 according to an extent at least equal to 80% of their length.

In the second operating condition (FIG. 7), the protrusions 37 are extracted from the cavities 39, for example according to an extent at least equal to 80% of their length.

The presence of the protrusions 37, of the cavities 39 and their mutual relation ensure that, in proximity to the abutment surface, circumferential rows of solid portions 40, defined by the protrusions 37, interposed between empty portions 41 defined by the cavities 39, can be identified at least in the second operating condition. The solid portions 40 and the empty portions 41 belonging to each circumferential row are circumferentially offset with respect to the solid portions 40 and, respectively, to the empty portions 41 of axially adjacent circumferential rows.

In order to ensure that the surface discontinuities induced by the alternation of solid portions 40 and empty portions 41 do not compromise a correct execution of the building, it is preferable that at least in proximity to an axial middle line plane E of the forming drum 23, still more preferably on all the protrusions 37 except those situated in proximity to the circumferential axially outer portions S1 of the abutment surface S, each protrusion 37 has axial dimension approximately comprised between about 4 mm and about 15 mm, preferably equal to about 8 mm. Each cavity 39 preferably has axial dimension equal to that of the protrusions 37 circumferentially aligned therewith.

It is also preferably provided that the empty portions 41 in the second operating condition have circumferential size comprised between about 30 mm and about 60 mm, preferably equal to about 40 mm.

In radially outer position, the protrusions 37 and the cavities 39 are shaped such that each of the sectors 24 overall has a cross section profile extending so as to substantially describe the entire transverse extension of the abutment surface S, from one to the other of said circumferential axially outer portions S1.

At the circumferential axially outer portions S1 of the abutment surface S, the axial size of the protrusions 37 and cavities 39 indicated above may prove unsuitable for a correct working.

Indeed it has been observed that due to the curvature presented by the cross section profile of the abutment surface S, the transverse dimension of the solid portions 40 and empty portions 41 is not equal to the axial dimension of the corresponding protrusions 37 and cavities 39 to which they belong. In particular, in the forming drums dedicated to making tyres for two-wheel vehicles, where the curvature ratio is relatively accentuated, the transverse dimension of the solid portions 40 and of the empty portions 41 at the circumferential axially outer portions S1 can be many times greater than that found in proximity to the axial middle line plane E.

Consequently, axially opposite terminal portions of the carcass sleeve 12, situated at the beads 6, might not be suitably supported and might be too free to move for the purpose of adequate opposition to the stresses.

In order for the carcass sleeve 12 to be efficiently supported by the forming drum 23, it is therefore provided that in the second operating condition the radially inner circumferential edges S2 of the abutment surface S have a diameter D1 not greater than a radially inner diameter D2 of the beads 6. More particularly, in the illustrated example, the diameter D1 of the radially inner circumferential edges S2 is preferably equal to or smaller than the radially inner diameter of the beads 6. In this manner, at the end of the shaping of the carcass sleeve 12, axially inner sides of said beads 6 are arranged in axial abutment relation against the respective circumferential axially outer portions S1 of the abutment surface S, defined on the circumferentially consecutive sectors 24.

Preferably, the forming drum 23 is positioned in the shaping station 13 before the respective carcass sleeve 12, e.g. still being worked along the carcass building line 10, reaches the shaping station 13 itself.

More particularly, it is preferably provided that the forming drum 23 be projectingly supported in the shaping station 13. For example, a first end 25a of the central shaft 25 of the forming drum 23 can for such purpose be retained by a mandrel 42 coaxially housed in the first gripping element 16a and carrying the rotary driver 34 couplable with the threaded bar 30 in order to drive it in rotation.

The forming drum 23 can therefore be arranged in the first operating condition by said rotary driver 34, if it is not already in such condition upon reaching the shaping station 13.

By means of carcass loading devices 43, the carcass sleeve 12 coming from the carcass building line 10 is then transferred into the shaping station 13 in order to be coaxially arranged in radially outer position around the forming drum 23 arranged in the first operating condition, radially contracted.

Figure 1:
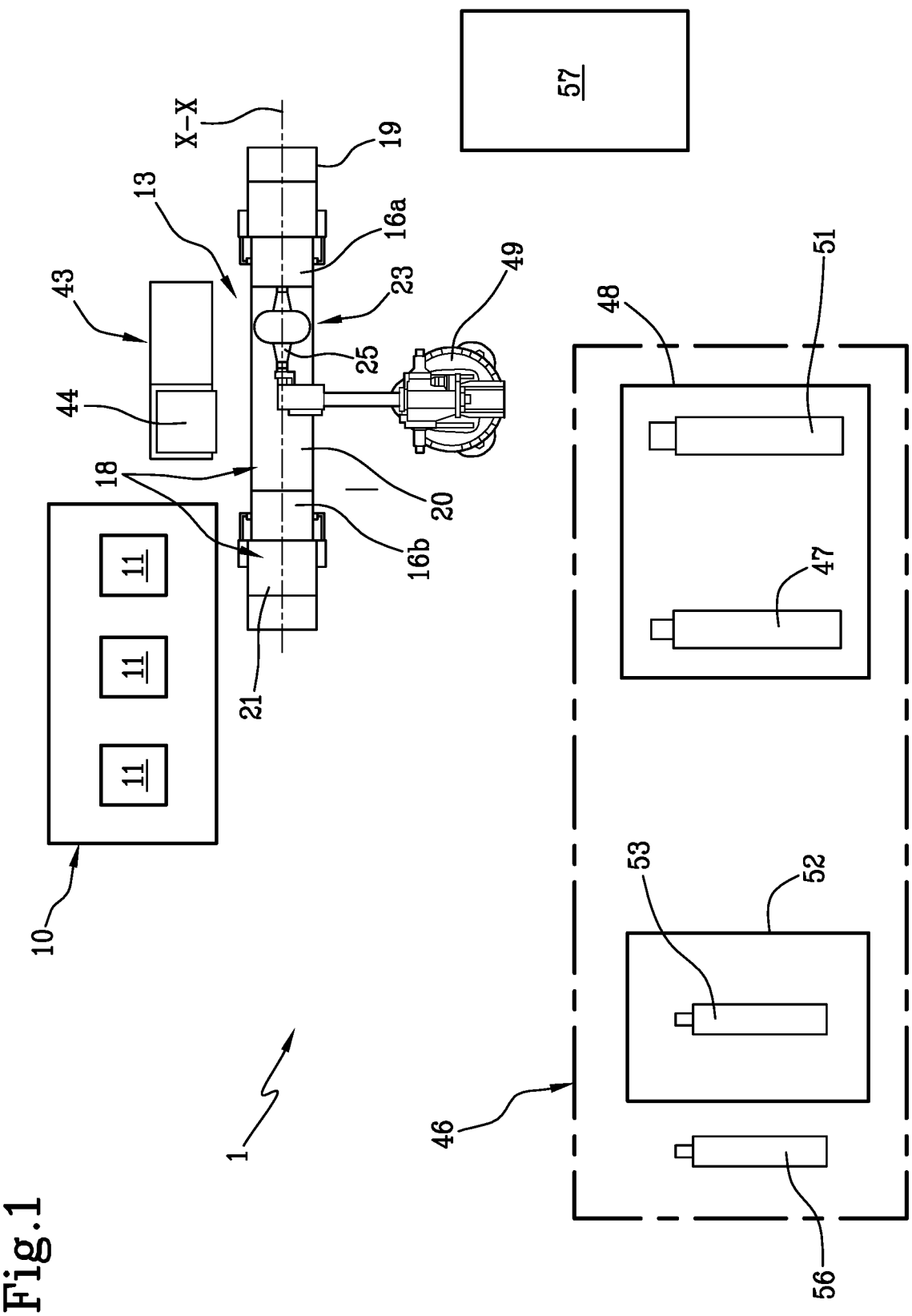
FIG. 1 schematically shows a top view of a plant for building tyres in accordance with the present invention.
Figure 2:
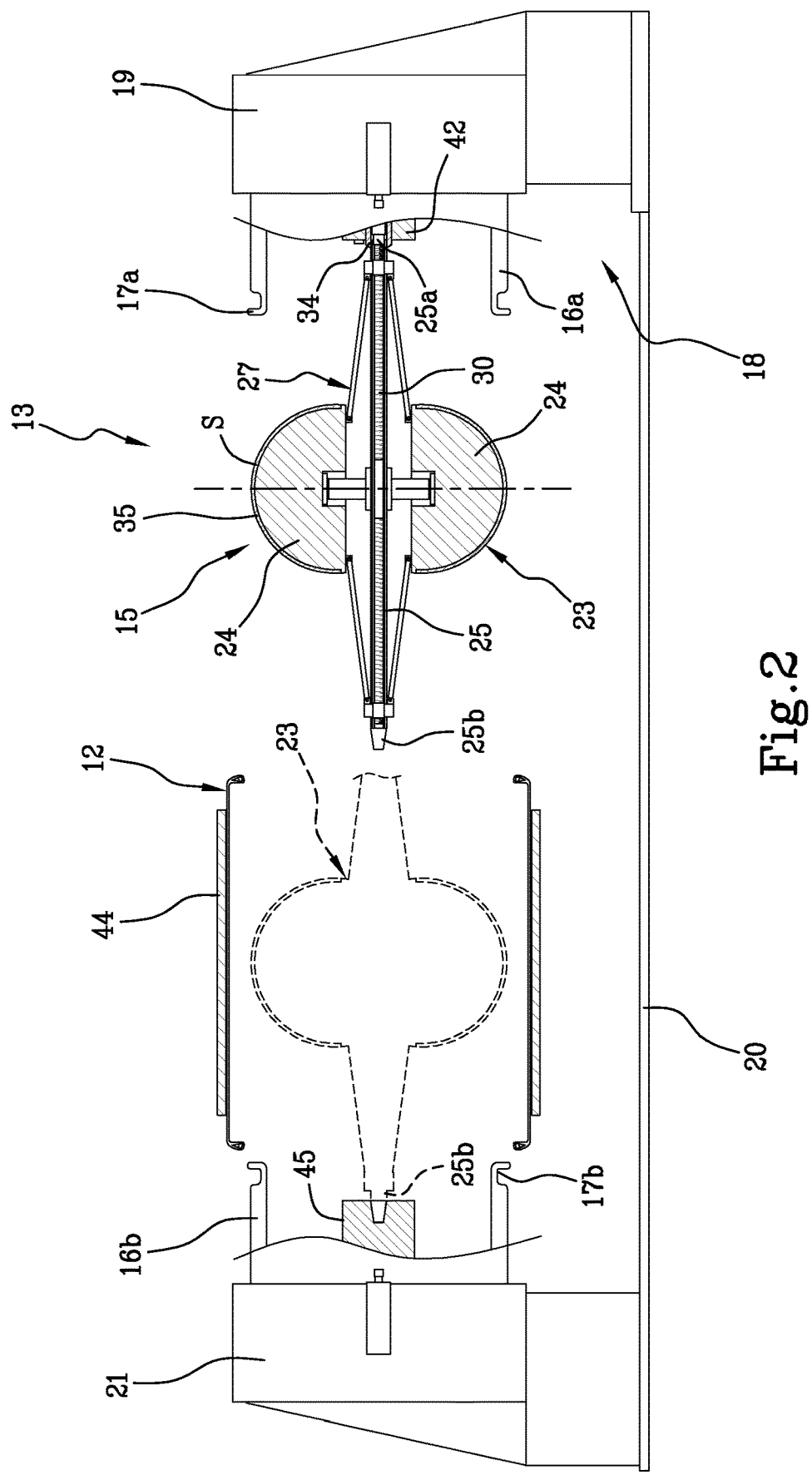
FIG. 2 schematically shows a side view in partial section of the loading of a carcass sleeve on a shaping station.
Figure 3:
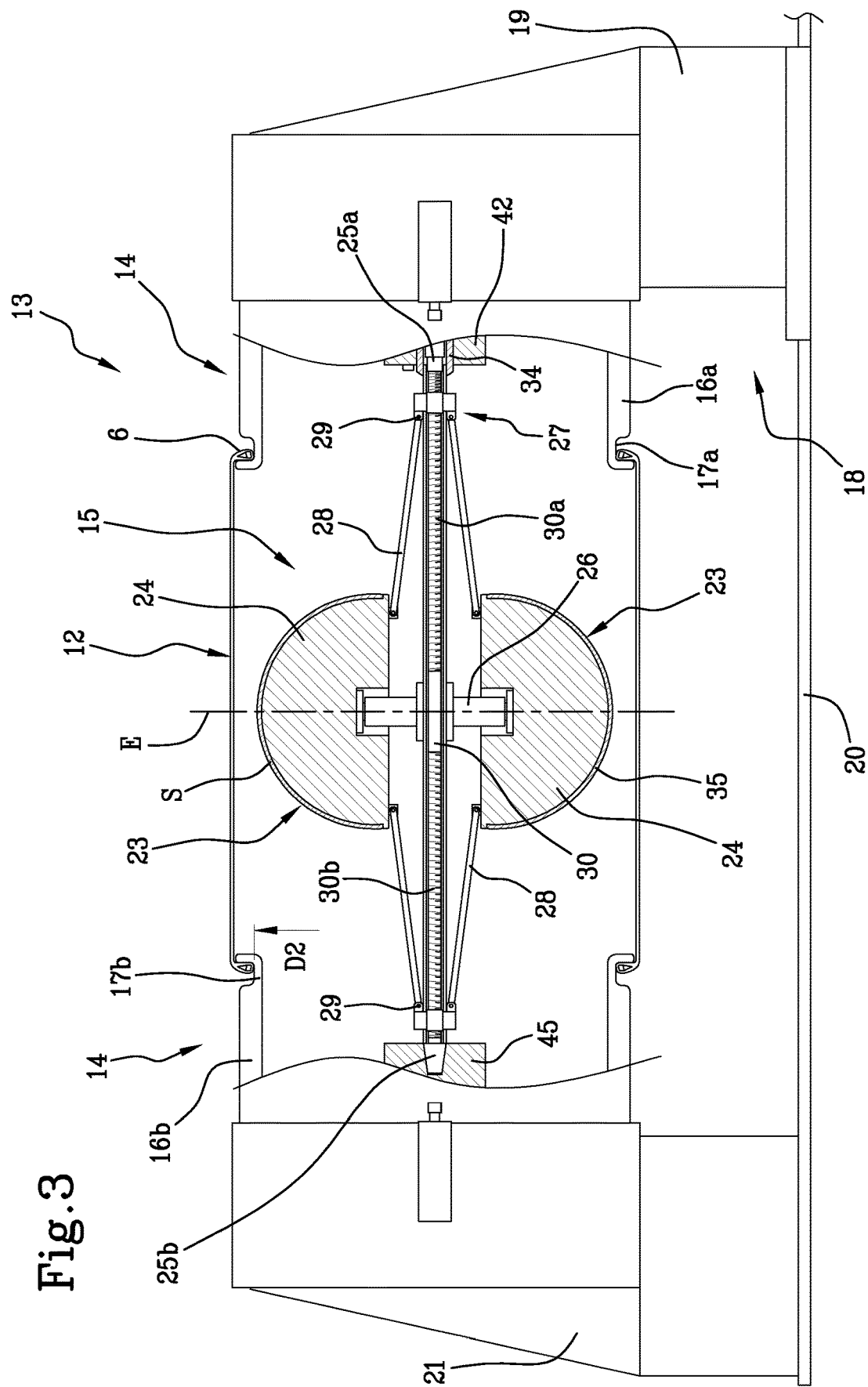
FIG. 3 schematically shows a side view in partial section of the action of centring the carcass sleeve with respect to a expandable forming drum engaged within the carcass sleeve itself.

The carcass loading devices 43 can for example comprise a carcass handler 44 preferably operating on an outer surface of the carcass sleeve 12. With a radial translation movement (with respect to the forming drum 23), the carcass sleeve 12 is first inserted, in axial alignment relation with the forming drum 23, between the gripping elements 16a, 16b arranged in the loading/unloading condition (FIG. 2). The carcass sleeve 12 is subsequently arranged around the forming drum 23, preferably following a movement of relative axial translation with respect to the forming drum itself. In the illustrated example, the forming drum 23 is coaxially inserted in the carcass sleeve 12 by a movement of the carriage 19 along the linear guides 20. Preferably, the translation of the carriage 19 and of the forming drum 23 terminates with the engagement of a second end 25b of the central shaft 25 with a tailstock 45, situated within the second gripping element 16b (hatched line in FIG. 2).

In order for the axial movement of the forming drum 23 with respect to the carcass sleeve 12 to be able to take place in the absence of mutual mechanical interferences, it is preferably provided that, in the first operating condition, the forming drum 23 has a maximum outer diameter smaller than the radially inner diameter D2 of the beads 6, which typically represents the minimum inner diameter detectable in the carcass sleeve 12.

At the end of the axial movement, each of the anchoring annular structures 5 integrated in the beads 6 is situated in axially inner position with respect to the circumferential engagement seat 17a, 17b of the respective first and second gripping element 16a, 16b.

Upon action of the axial movement members 18 and/or other suitable devices, the gripping elements 16a, 16b are moved axially close to each other, translating the respective engagement seats 17a, 17b in mutual approaching in order insert them axially in the carcass sleeve 12. More particularly, the engagement seats 17a, 17b axially translate, each from the exterior towards the interior of the respective anchoring annular structure 5, until they are stopped substantially in a radial alignment relation within the latter.

The carcass handler 44 can be moved away from the shaping station 13 after having disengaged the carcass sleeve 12, which remains suspended with the anchoring annular structures 5 thereof in abutment against the engagement seats 17a, 17b.

Expansion members associated with each of said gripping elements 16a, 16b and not depicted since attainable in any convenient manner, determine an expansion of the circumferential engagement seats 17a, 17b. Following such radial expansion, the gripping elements 16a, 16b are induced to act, by means of the respective circumferential engagement seats 17a, 17b, each in radial thrust relation from the interior towards the exterior against one of the anchoring annular structures 5. The carcass sleeve 12 is thus stably constrained to the gripping elements 16a, 16b.

In conjunction with the radial expansion of the engagement seats 17a, 17b, i.e. immediately before, immediately after or during at least one part of such radial expansion, an axial movement of mutual moving away of the gripping elements 16a, 16b can be driven upon action of the axial movement members 18 and/or other suitable devices. In this situation, the gripping seats 17a, 17b act in axial thrust relation from the interior towards the exterior against the axially inner sides of the respective anchoring annular structures 5, determining a mutual axial moving away thereof with consequent axial extension of the carcass sleeve 12. If necessary, the axial movement of the gripping elements 16a, 16b is also exploited so that the carcass sleeve 12 is axially centred with respect to the forming drum 23. By means of rotation of the threaded bar 30 upon action of the rotary driver 34, the radial expansion of the forming drum 23 can be driven in order to start the shaping of the carcass sleeve 12.

Preferably, the shaping of the carcass sleeve 12 takes place only by radial expansion of the forming drum 23, in the absence of internal pressurisation actions of the carcass sleeve 12 itself. In other words, during the shaping of the carcass sleeve 12, the radially inner parts of the latter can be conveniently maintained in fluid communication with the external environment, hence at atmospheric pressure.

Figure 4:
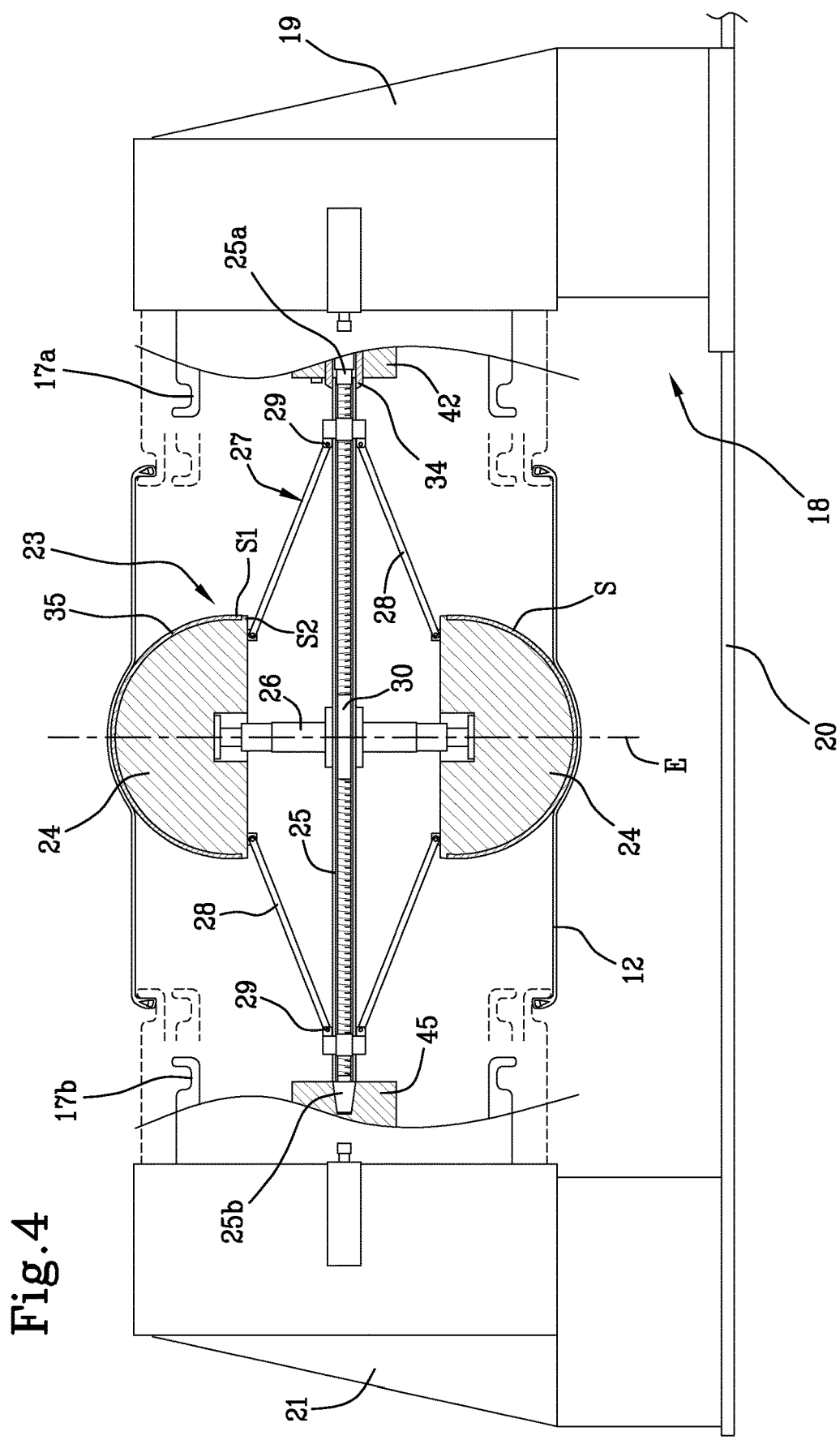
FIG. 4 schematically shows a side view of the carcass sleeve immediately after an initial shaping step.
Figure 5:
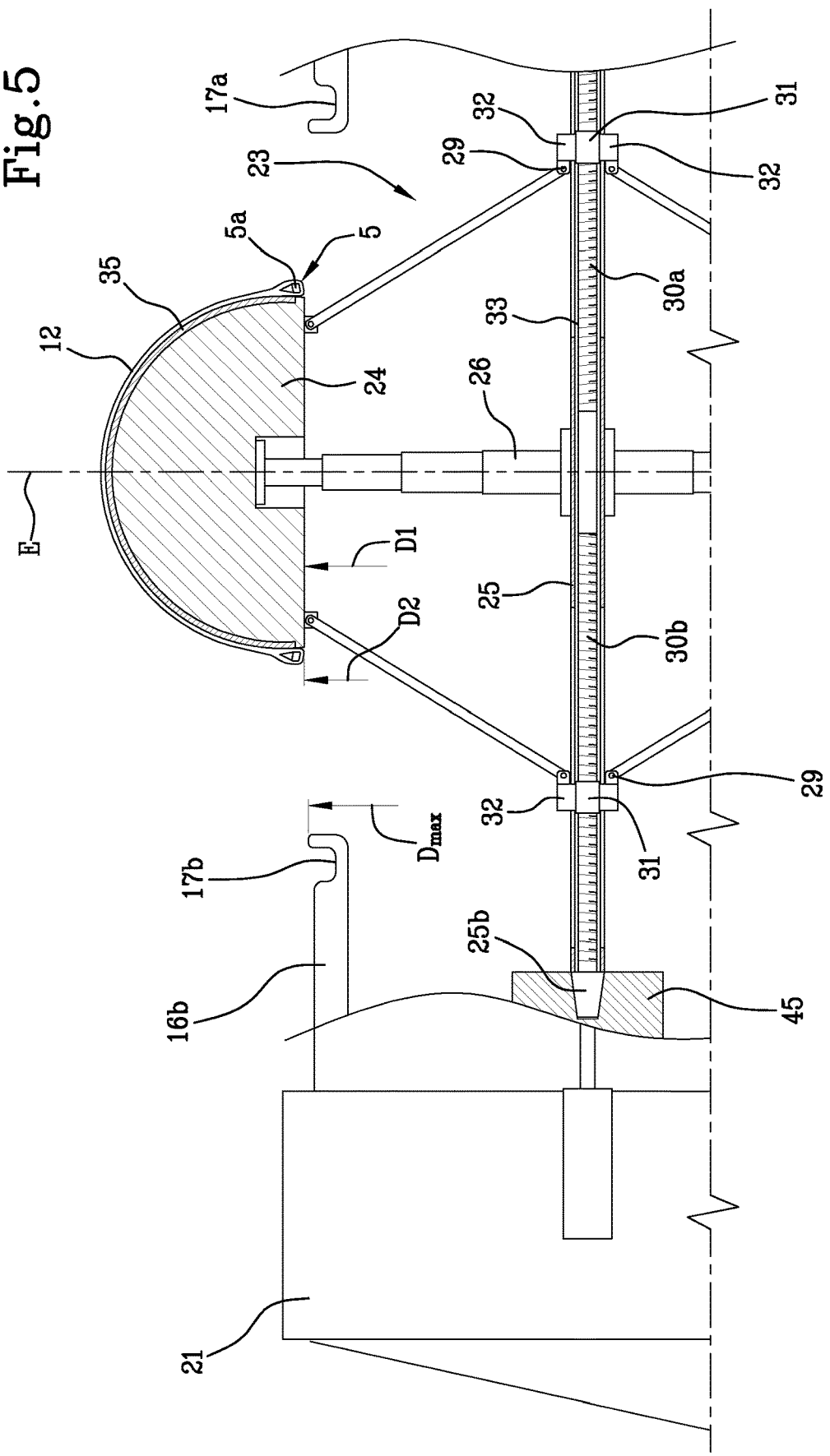
FIG. 5 schematically shows a side view of the carcass sleeve engaged with the forming drum at the end of the shaping.

As schematised in FIG. 4, during the expansion of the forming drum 23, immediately after a radially outer portion of the latter has abutted against the carcass sleeve 12, e.g. coming into direct contact with the latter in proximity to the axial middle line plane E, the gripping seats 17a, 17b can be radially contracted and possibly moved away from each other, so that the gripping elements 16a, 16b disengage the anchoring annular structures 5 and remain disengaged therefrom for the remaining part of the expansion of the forming drum 23.

When the gripping elements 16a, 16b disengage the carcass sleeve 12, the beads 6 remain projectingly suspended from the forming drum 23 itself, while the contact between the radially outer part of the forming drum 23 and the carcass sleeve 12 stabilises the positioning of the latter with respect to the forming drum itself.

With the progression of the radial expansion, the carcass sleeve 12 is toroidally shaped due to a radial thrust action exerted by the sectors 24 of the forming drum 23 directly against the carcass sleeve 12 itself.

Simultaneously, the elastic membrane 35, having respective radially inner circumferential flaps 35a constrained to the sectors 24 at the radially inner circumferential edges S2 of the abutment surface S, expands in sliding contact relation against the sectors 24, while it maintains a substantially static abutment relation, i.e. in the absence of significant sliding and preferably by direct contact, with respect to the inner surface of the carcass sleeve 12. The presence of the elastic membrane 35 or other stratiform coating eliminates the risk of damage of the carcass sleeve 12 as a result of the undesired sliding against the abutment surface S. With the progress of the radial expansion of the forming drum 23, also the carcass sleeve 12 is radially expanded according to a toroidal configuration, adhering against the abutment surface S progressively moving away from the axial middle line plane E, towards the beads 6. More particularly, the tensions transmitted through the carcass sleeve 12 during the progressive radial moving away of the sectors 24 determine a corresponding progressive axial approach of the beads 6 to the abutment surface S. The substantial inextensibility of the cords that normally constitute the carcass ply or plies 3 facilitates said tension.

When the forming drum 23 reaches the second operating condition, the beads 6 abut against the respective circumferential axially outer portions S1 of the abutment surface S, situated at the radially inner circumferential edges S2, completing the shaping of the carcass sleeve 12.

In order to facilitate a suitable support for the beads 6, the diameter D1 of the radially inner circumferential edges S2 of the abutment surface S is preferably smaller than a radially outer diameter Dmax of said annular gripping elements 16a,16b. Advantageously, the disengagement and moving away of the gripping elements 16a, 16b from the beads 6 in the initial phase of the shaping simplifies the elimination of possible mechanical interferences between the gripping elements themselves and the forming drum 23.

It can be provided that with the attainment of the second operating condition, the radial moving away of the sectors 24 at the end of the shaping also imposes a controlled tension at the carcass sleeve 12, which can be maintained up to the removal of the forming drum 23 from the built tyre 2. Such controlled tension can facilitate the maintenance of the beads 6 in axial thrust relation against the circumferential axially outer portions S1 of the abutment surface S.

Carcass sleeve 12 and forming drum 23 in mutual coupling relation are adapted to be removed from the shaping station 13 and subjected to the action of deposition devices 46, configured for forming further components of the tyre 2 being worked outside the shaped carcass sleeve 12, e.g. by means of application of one or more elementary semi-finished products 54 in radially outer position with respect to the abutment surface S. The deposition devices 46 can for example comprise at least one device 47 for building at least one belt layer in radially outer position with respect to the shaped carcass sleeve 12. Such device 47 is preferably installed in an application station 48 that is remote with respect to said shaping station 13.

In order to allow the transfer thereof to the application station 48, it is provided that the forming drum 23 carrying the carcass sleeve 12 be supported by the mandrel 42 operating at the first end 25a of the central shaft 25, while the tailstock 45 is disengaged from the second end 25b of the central shaft 25 itself. With a retreating of the carriage 19 carrying the first gripping element 16a, the shaping station 13 is brought back into the loading/unloading condition, freeing the access to suitable transfer devices, configured for transferring the forming drum 23 carrying the carcass sleeve 12 from the shaping station to the deposition devices 46. The transfer devices can for example comprise a first anthropomorphic robotic arm 49, preferably with at least six axes, which provides for engaging the forming drum 23 at the second end 25b of the central shaft 25.

In the illustrated example, the first robotic arm 49 transfers the forming drum 23 from the shaping station 13 to the application station 48. The first robotic arm 49 also provides for suitably moving the forming drum 23 in front of the building device 47 of the belt layer, which can for example comprise a dispenser which feeds at least one first elementary semi-finished product 47a, e.g. one or more rubber-covered cords or other elongated continuous reinforcement element made of textile and/or metallic material covered with elastomeric material, to a first applicator roller 50. The first applicator roller 50 provides for depositing the first elementary semi-finished product 47a on the carcass sleeve 12, according to circumferential turns "C" axially side by side each other, so as to make the belt layer 7a around the radially outer surface of the carcass sleeve 12 coupled to the toroidal expanded forming drum 23, while the latter is rotated and suitably moved by the first robotic arm 49.

The rigidity of the forming drum 23 ensures a stable positioning of the single circumferential turns "C" formed directly on the shaped carcass sleeve 12, without undesired deformations of the carcass sleeve 12 being verified due to the stresses transmitted on the outer surface thereof during application, e.g. due to the first applicator roller 50. The stickiness of the green elastomeric material that constitutes the carcass ply or plies 3 prevents undesired spontaneous and/or non-controlled movements of the single circumferential turns "C", without it being necessary for such purpose to arrange additional intermediate layers between the belt layer 7a being made and the underlying application surface. In other words, a precise positioning is facilitated for the single circumferential turns "C" of the belt layer 7a, directly formed according to the desired final profile of the carcass sleeve 12 upon completed shaping, even when such profile has an accentuated transverse curvature as for example can be typically found in the tyres intended for motorcycles or other two-wheel vehicles.

The application station 48 can if necessary comprise devices 51 for building one or more auxiliary layers 7b, to be applied on the shaped carcass sleeve 12 before or after the application of said at least one belt layer 7a. In particular, such auxiliary layers 7b can comprise textile or metallic parallel cords, arranged according to an orientation that is tilted with respect to the circumferential extension direction of the carcass sleeve 12, respectively cross between auxiliary layers 7b that are adjacent to each other.

By means of the first robotic arm 49, or by means of a second anthropomorphic robotic arm or manipulator of another type, the forming drum 23 is then transferred from the application station 48 to a sidewalls application station 52, preferably being part of the deposition devices 46 integrating the same application station 48.

In the sidewalls application station 52, a coiling unit 53 can for example operate. Such coiling unit 53 is configured for wrapping at least one second elementary semi-finished product 54 in the form of an elongated continuous element made of elastomeric material according to circumferential turns "C1" axially side by side and/or at least partially superimposed against axially opposite lateral portions of the carcass sleeve 12 in proximity to the beads 6, while the forming drum 23 is driven to rotate and suitably moved, for example by the same first robotic arm 49, in order to distribute the circumferential turns "C1" according to a predefined scheme. The application of the second elementary semi-finished product 54 in the form of an elongated continuous element preferably takes place with the aid of a respective second applicator roller 55.

The plant 1 can also comprise devices for making tread bands 56 that can operate in an analogous manner to the coiling unit, in order to make the tread band 8 around the belt structure 7 up to in proximity to the sidewalls 9, before or after the making thereof.

The geometric and size parameters of the protrusions 37 and cavities 39 arranged in the forming drum 23 allow suitably supporting the carcass sleeve 12 without the same having to sustain excessive localised stresses or twisting under the effect of the thrust exerted by the applicator rollers 50 and 55. Indeed, at each of the cavities 39, the carcass sleeve 12 is supported as a bridge between two axially contiguous protrusions 37.

Figure 11:
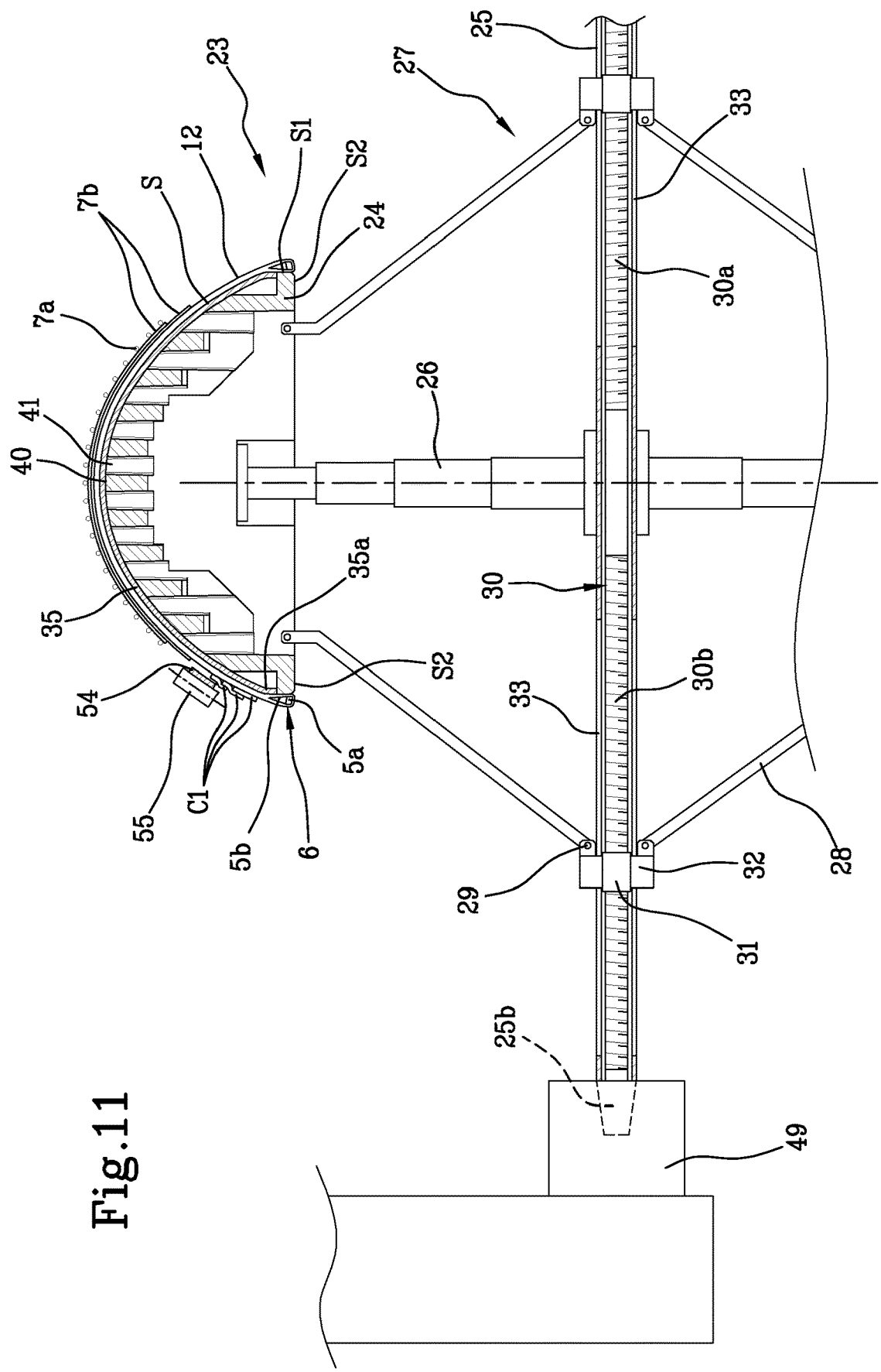
FIG. 11 shows the application of a sidewall on the shaped carcass sleeve that is coupled to a forming drum.

In addition, at each of the cavities 39 situated along the radially inner circumferential edges S1, each bead core 5a is adapted to act as a kind of bridge-like beam supported between two abutments, suitably opposing the thrust action exerted by the second applicator roller 55, even if the latter is localised in an action area, measurable against the abutment surface S in a radial plane of the forming drum 23, having transverse dimension smaller than the transverse dimension of the empty portions 41, as exemplified in FIG. 11. Such FIG. 11 illustrates the application of the second elementary semi-finished product 54 for the purpose of attaining a radially inner portion of one of the sidewalls 9, in proximity to the respective radially inner apex 9a. Due to the abutment of the bead cores 5a against the solid portions 40 of circumferentially contiguous sectors 24 at the circumferential axially outer portions S1 of the abutment surface S, the beads 6 are able to effectively oppose the thrust action exerted by the second applicator roller 55 even in proximity to the zones proximal to the radially inner edges S2 and axially opposite edges of the forming drum 23, where the orientation of the abutment surface itself is substantially radial with respect to the geometric rotation axis X-X or in any case quite tilted with respect to the latter.

It is therefore possible to effectively apply the radially inner apices 9a of the sidewalls 9 and/or other components at the beads 6, without inducing significant deformations of the carcass sleeve 12 under the thrust action exerted by the second applicator roller 55.

The controlled tension conferred to the carcass sleeve 12 at the end of the shaping ensures a constant thrust of the beads 6 against the drum, facilitating the stability of the latter. In particular, it is possible to eliminate undesired vibratory oscillations of the beads 6 which could negatively affect a correct application of the components, particularly in proximity to the beads 6 themselves.

The built green tyre 2 is subsequently adapted to be removed from the forming drum 23 in order to be moulded and vulcanised in a vulcanisation unit 57.

The invention claimed is:

1. A process for building tyres comprising:
    positioning, in a shaping station, a toroidal forming drum within a carcass sleeve comprising at least one carcass ply associated with a pair of beads;
    wherein after positioning in the shaping station, the carcass sleeve is engaged by one or more gripping elements operating axially and/or radially inside the beads;
    shaping the carcass sleeve toroidally by radial expansion of the forming drum from a first, radially contracted, operating condition, up to a second,
    radially expanded, operating condition forming an expanded forming drum, the expanded forming drum having a toroidal shape corresponding to an inner shape of the shaped carcass sleeve;
    wherein during shaping by radial expansion of the forming drum, the one or more gripping elements disengage the beads after a radially outer portion of the forming drum has abutted against the carcass sleeve;
    imposing a controlled tension to the carcass sleeve by the expanded forming drum at the second, radially expanded, operating condition after the end of the shaping and causing the beads, due to the controlled tension, to act in axial thrust relation against respective axially outer circumferential portions of an abutment surface carried by the expanded forming drum;
    removing the forming drum carrying the shaped carcass sleeve from the shaping station; and
    applying sidewall portions externally on the shaped carcass sleeve carried by the expanded forming drum;
    wherein the sidewall portions are applied by wrapping at least one elongated continuous element made of elastomeric material according to circumferential turns against axially opposite lateral portions of the carcass sleeve in proximity to the beads, while the forming drum rotates and moves to distribute the circumferential turns according to a predefined scheme;
    wherein wrapping of the elongated continuous element takes place with the aid of an applicator roller exerting a thrust action on the carcass sleeve;
    further comprising maintaining the controlled tension to the carcass sleeve by the expanded forming drum at the second, radially expanded, operating condition after the end of the shaping and causing the beads, due to the controlled tension, to maintain their axial thrust action against the expanded forming drum after the end of shaping, wherein during the application of said sidewall portions, entire axially inner surfaces of said beads are in axial thrust relation against the respective axially outer circumferential portions of the abutment surface, while the beads oppose the thrust action exerted by the applicator roller in proximity to radially inner edges of the forming drum.

2. The process according to claim 1, wherein shaping takes place due to a radial thrust action exerted by the radial extension of the forming drum directly against the carcass sleeve.

3. The process according to claim 2, wherein shaping takes place absent internal pressurization of the carcass sleeve.

4. The process according to claim 3, wherein during shaping, radially inner parts of the carcass sleeve are in fluid communication with an external environment.

5. The process according to claim 4, further comprising engaging the carcass sleeve prior to the shaping by radially expanding the one or more gripping elements, wherein each is axially inside one of said beads.

6. The process according to claim 5, wherein before the shaping of the carcass sleeve is completed, the one or more gripping elements disengage the beads during the radial expansion of the forming drum.

7. The process according to claim 6, wherein during shaping, the one or more gripping elements are disengaged from the beads after said abutment surface has abutted against the carcass sleeve.

8. The process according to claim 7, wherein before being placed within the carcass sleeve, the forming drum is arranged in the first, radially contracted, operating condition.

9. The process according to claim 8, wherein during the shaping of the carcass sleeve, translating circumferentially consecutive sectors of said forming drum radially between the first, radially contracted, operating condition wherein said sectors are approached with respect to a geometric rotation axis of the forming drum, and the second, radially expanded, operating condition wherein the sectors are radially distanced from said geometric rotation axis to define said abutment surface.

10. The process according to claim 9, wherein shaping takes place by the radial moving away of the sectors of the forming drum up to said second operating condition.

11. The process according to claim 10, wherein said axially outer circumferential portions are on circumferentially consecutive sectors of the forming drum.

12. The process according to claim 11, wherein each of said sectors has, in radially outer position, a cross section profile extending according to said abutment surface from one to the other of said axially outer circumferential portions.

13. The process according to claim 12, further comprising axially moving away the beads one with respect to the other, before said abutment surface abuts against the carcass sleeve.

14. The process according to claim 13, wherein the abutment surface is at least partly defined by a stratiform coating applied on the forming drum.

15. The process according to claim 14, wherein said stratiform coating comprises an elastic membrane.

16. The process according to claim 15, wherein during the radial expansion of the forming drum, said stratiform coating expands in sliding contact relation against the sectors.

17. The process according to claim 16, wherein during the radial expansion of the forming drum, said stratiform coating expands in substantially static contact relation against the radially inner surface of the carcass sleeve.

18. The process according to claim 17, wherein during the radial expansion of the forming drum, said stratiform coating expands in substantial absence of sliding with respect to the radially inner surface of the carcass sleeve.

19. The process according to claim 18, wherein during the radial expansion of the forming drum, the abutment surface abuts against the carcass sleeve progressively towards the beads.

20. The process according to claim 19, wherein during the radial expansion of the forming drum, a progressive axial approach of the beads towards the abutment surface is carried out as a result of tensions transmitted through the carcass sleeve.

21. The process according claim 20, wherein prior to the shaping, the carcass sleeve is axially centered with respect to the forming drum.

22. The process according claim 21, wherein prior to the shaping by the axial movement of the one or more gripping elements, the carcass sleeve is axially centered with respect to the forming drum.

23. The process according claim 22, wherein before positioning, the carcass sleeve is made in at least one building location and subsequently transferred to said shaping station.

24. The process according to claim 23, wherein during positioning, the carcass sleeve is arranged around the forming drum arranged in the shaping station by a relative axial translation between the carcass sleeve and the forming drum.

25. The process according to claim 24, wherein before applying, the expanded forming drum is transferred to deposition devices to build, externally on the carcass sleeve, the sidewall portions.

26. The process according to claim 25, wherein the one or more tyre components is made by wrapping at least one elongated continuous element according to circumferential turns axially side by side around a radially outer surface of the carcass sleeve coupled to the expanded forming drum.

27. The process according to claim 26, wherein the one or more tyre components comprises at least one sidewall portion with a radially inner apex joining with one of said beads.

* * * * *